Jan. 27, 1931.　　　W. H. WHITACRE　　　1,790,294
SUSPENSION FOR TRACTORS
Filed June 19, 1926　　　4 Sheets-Sheet 1

Patented Jan. 27, 1931

1,790,294

UNITED STATES PATENT OFFICE

WILLIAM H. WHITACRE, OF CLEVELAND HEIGHTS, OHIO, ASSIGNOR TO CATERPILLAR TRACTOR CO., OF SAN LEANDRO, CALIFORNIA, A CORPORATION OF CALIFORNIA

SUSPENSION FOR TRACTORS

Application filed June 19, 1926. Serial No. 117,089.

This invention relates to a suspension for tractors of the crawler type and has particular reference to the suspension of the front portion of the tractor frame or power plant on the track frames.

The principal object of the invention is to provide an improved front spring mounting with an equalizing action which permits the oscillation of the track frames as they encounter inequalities of the ground without subjecting the main frame or power plant to undue or excessive twisting or other stresses.

A further object is to provide a mounting or suspension for the front portion of a Fordson Tractor power plant, which can be readily applied without doing any machining or making any alterations in the power plant itself.

The above and other objects are attained by my invention which may be briefly summarized as consisting in certain novel details of construction and combinations and arrangements of parts which will be described in the specification and set forth in the appended claims.

Figure 1:
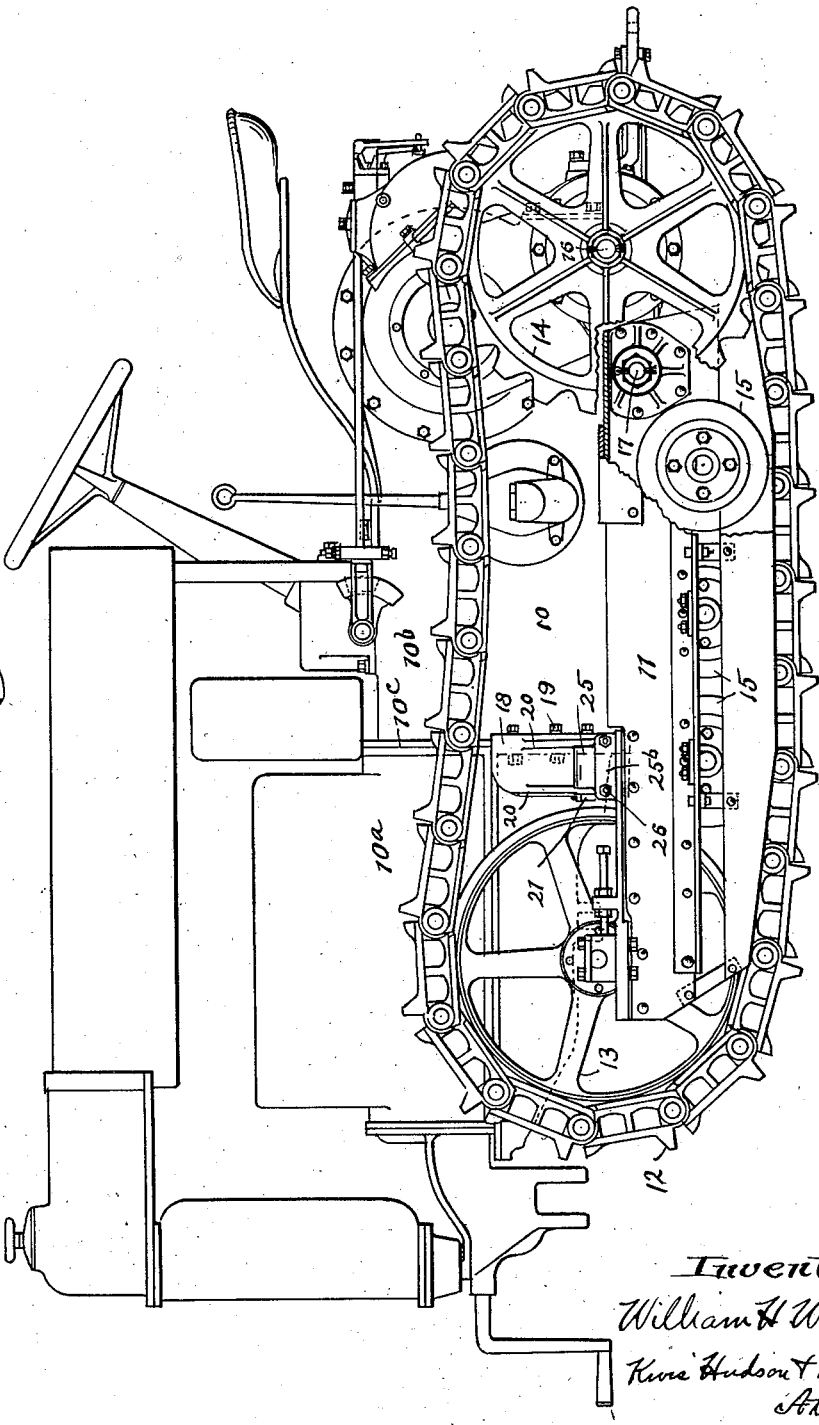
Figure 2:
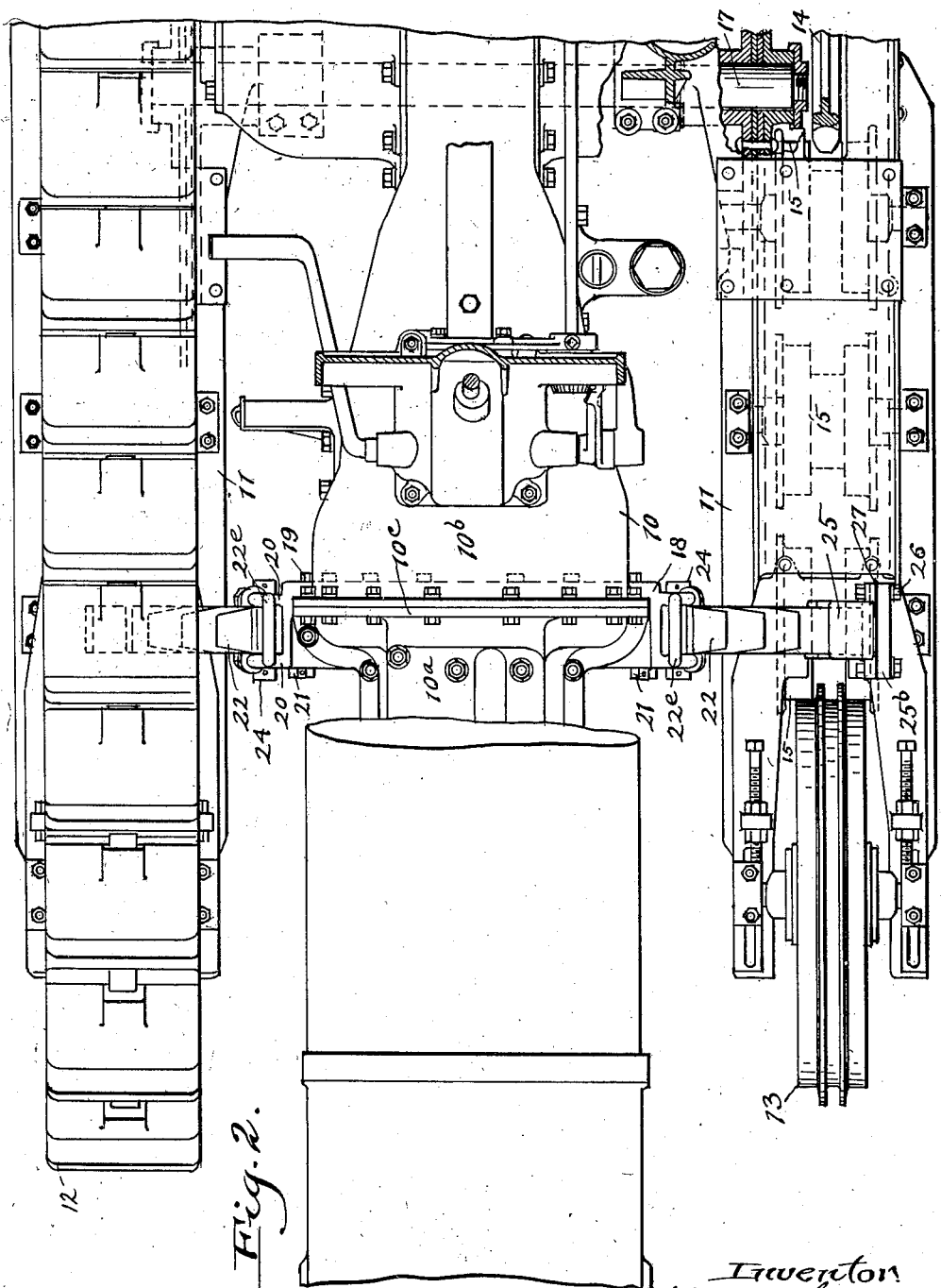
Figure 3:
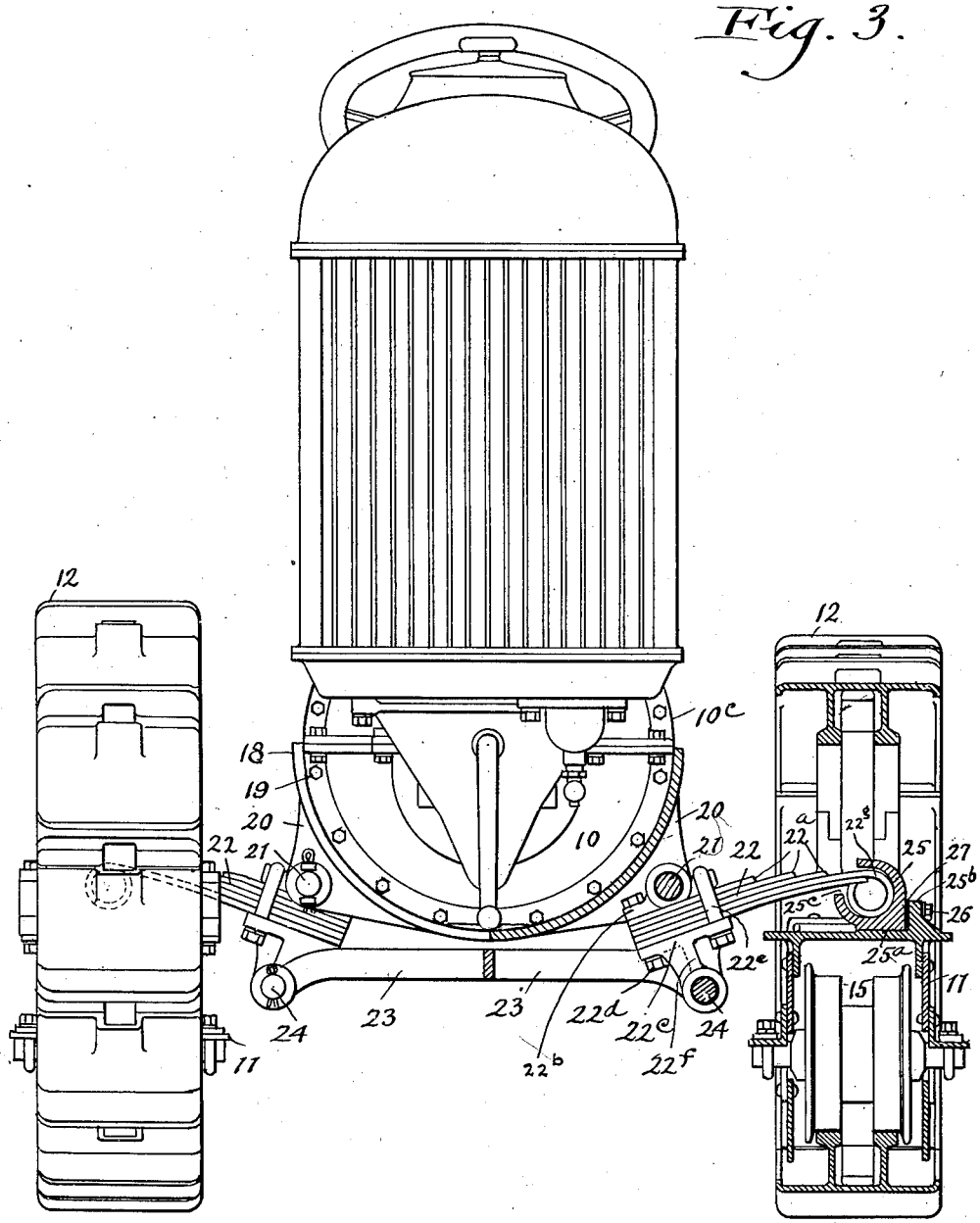
Figure 4:
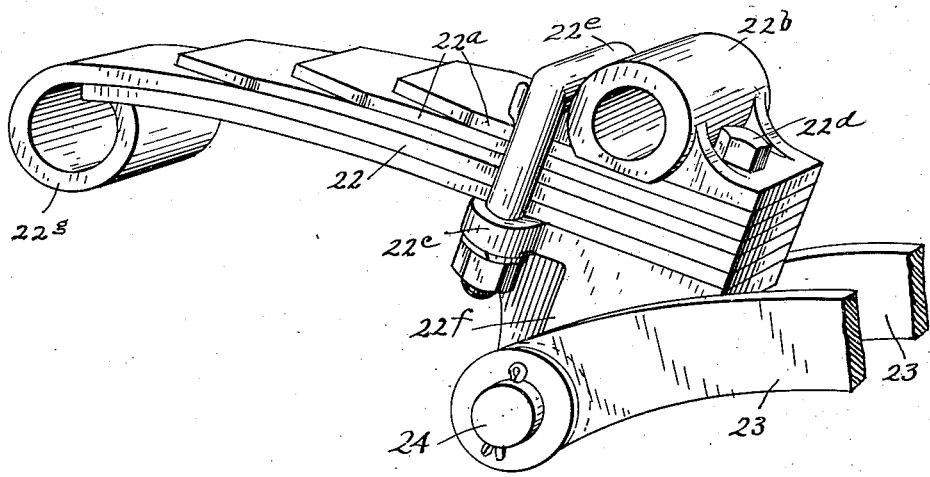
Figure 5:
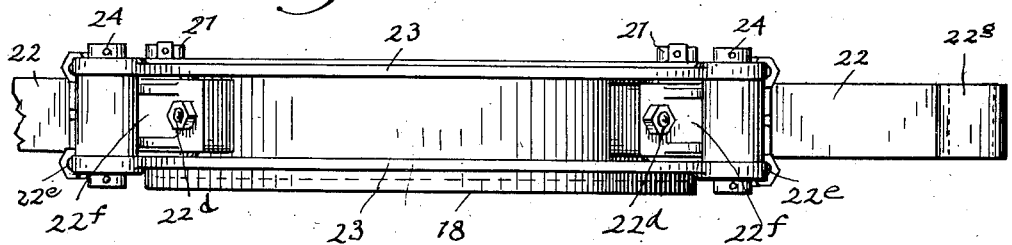
Figure 6:
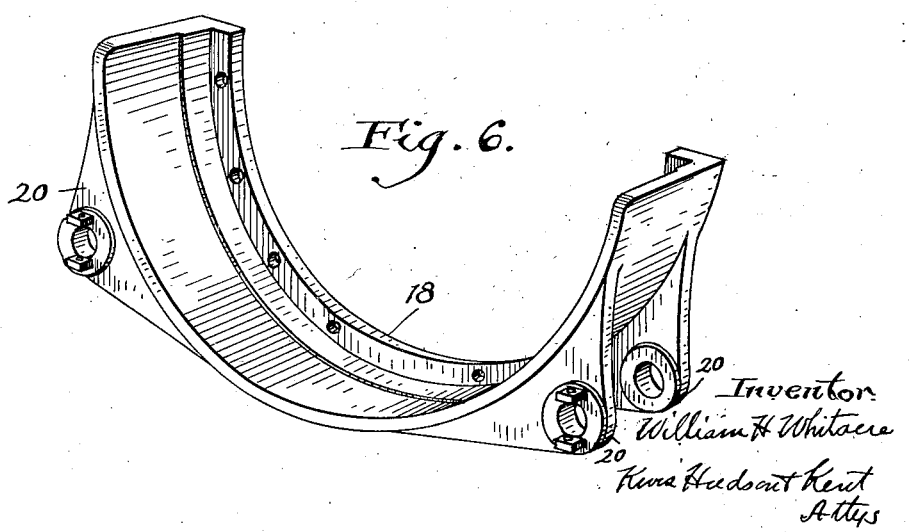

In the accompanying sheets of drawings which show an embodiment of the invention which operates very effectively, Fig. 1 is a side elevation with parts in section; Fig. 2 is a top plan view with parts in section and other parts broken away; Fig. 3 is a view partly in front elevation and partly in section along a line transversely of the tractor and adjacent the front edge of an arm 22; Fig. 4 is a perspective view illustrating one of the spring arms of the front mounting and portions of two links connected thereto; Fig. 5 is a bottom view of the parts of the front mounting; and Fig. 6 is a perspective view of a casting to which the two spring arms of the front mounting are attached.

In the accompanying sheets of drawings, I have shown the power plant of a Fordson wheel tractor, this power plant constituting at the same time the main frame of the tractor.

In the embodiment illustrated, the suspension constitutes a portion of a crawler attachment for Fordson Tractors other features of which attachment are illustrated in a prior application, Serial No. 56,637, Filed Sept. 16, 1925 which has matured into Patent No. 1,744,516, dated January 21, 1930. However, the suspension or mounting for the front part of the main frame or power plant is, I believe, applicable generally to tractors of the crawler type and I, therefore, regard the drawings as illustrative generally of the principle of the invention, it being understood that I am not to be limited either to a power plant of the type illustrated or to a crawler attachment for any particular kind of tractor.

Referring now to the drawings, 10 represents the main frame and power plant which includes the propelling engine, and the transmission with any suitable driving means adapted to be connected to the track driving sprockets. At opposite sides of the power plant are the track frames designated generally by the reference character 11, these frames being provided with endless tracks 12 which extend about front idler sprockets 13 and rear driving sprockets 14, the track frames carrying the usual track wheels 15 which engage the lower run of the tracks. The driving sprockets 14 are, in this instance, mounted upon shaft 16 which can be driven by any suitable driving mechanism from the transmission of the power plant, for example, as illustrated in my prior application.

The rear portion of the main frame and power plant is supported by a cross-shaft 17 on the outer ends of which the rear portions of the track frames 11 are pivotally connected as indicated in Fig. 2. Aside from the fact that the rear ends of the track frames are pivotally connected to the main frame and power plant so that the track frames as a whole may oscillate independently, the details of the rear mounting are not material to the present invention but they may be as illustrated in my prior application which shows the cross-shaft 17 as supported in fixed position with reference to the main frame and power plant, with the rear portions of the track frames provided with inwardly extending bosses journaled on the outer ends of the shafts.

The mounting for the front part of the power plant or the front part of the suspension which embodies the present invention, will next be considered. This mounting or portion of the suspension is, in this instance, applied, as in my prior application, to the flanged joint 10c between the motor 10a of the power plant and the transmission housing 10b of the power plant, and the mounting includes, to permit the attachment at this point, a casting 18 which is substantially semi-circular and is attached by bolts 19 to the rear face of the flanged joint, this casting extending in semi-circular fashion around the lower half of the joint, the attaching bolts 19 being slightly longer than the bolts normally employed in fastening together the lower halves of the flanges of a Fordson power plant.

This casting 18 which, it will be observed, extends forwardly beyond the flanged joint 10c, is provided on opposite sides of the center line and in fact on opposite sides of the power plant, with two pairs of spaced ears 20 extending laterally of the power plant as indicated in the drawings. Pivotally connected between the ears 20 by means of pins 21 are spring arms 22, these two spring arms being formed in a manner shortly to be explained, and extending laterally outward and having pivotal supporting connections in a manner to be explained, with the front portions of the track frames.

In the preferred embodiment each spring arm includes a series of leaf springs 22a and a spring clamp or head composed of an upper member 22b which is journaled in the pin between the ears 20, and a lower member 22c which is secured to the upper member 22b by a through-bolt 22d and a U-bolt 22e, these bolts clamping tightly together the two members 22b and 22c and the inner ends of the leaves of the spring. The lower members 22c of the spring clamps are extended downwardly by means of extensions 22f which are at substantially right angles to the leaves of the spring so that the equivalent of a bell crank is provided by the construction with the laterally or outwardly extending arms of a yieldable nature. The lower ends of the extensions 22f of the two bell crank arms thus formed, are connected together so that the bell crank arms are caused to rock in unison by a pair of links 23, the ends of which are connected by pins 24 to the extensions 22f.

The outer ends of the springs 22a of the bell crank arms 22 extend over the track frames as best illustrated in Fig. 3, and the extreme outer end of each spring has a seat or bearing on the part of the associated track frame near the front end thereof. In this instance the outer end of one of the leaves of the spring is curved in the form of an eye 22g of substantially cylindrical form and this eye is received in a socket member 25 carried by the track frame. Preferably the socket member is formed separately from the track frame, the bottom portion resting upon a seat 25a and the outer portion being secured to an upstanding rib 25b of the track frame by bolts 26 which extend through the upstanding rib and through ears which are formed on the socket member beyond the spring receiving portion thereof. The socket member 25 is formed separately from the track frame proper so that it can be removed in case of wear or for any other reason, and for the further reason that it permits shimming between it and the ear 25b, (this shimming being indicated at 27 in Fig. 3), so as to avoid the necessity of machining to extreme accuracy.

It will be noted that the eye on the leaf of the spring which extends into the socket has a substantial bearing in the socket and that the eye may rock in the socket about the longitudinal axis of the eye, by reason of the fact that the socket is provided on its inner side with a slot 25c through which the spring extends, the slot being wide enough across it to permit freedom of movement of a rocking nature to suit the required oscillation of the track frame. It will be noted also that when the parts of the front suspension are in what may be termed a neutral position, the pivotal center of each spring arm or bell crank 22 is substantially on a line with the center of the eye of the spring. Accordingly, as the front end of the track frame rocks up and down, swinging the spring arm about the center of pin 21, the eye moves inwardly slightly with respect to the position which it occupies when the arm is in neutral position. Provision is made for this inward movement by having the socket piece 25 somewhat wider than the diameter of the eye. Thus the spring arms are capable of rocking freely without causing any binding action between the eyes of the springs and the socket members.

If one of the tracks rides over an elevation or drops into a depression, the track frame oscillates about its rear end. This rocks the associated spring arm but the same movement is transmitted by the links 23 to the opposite spring arm which, of course, has a rocking movement which is similar to but opposite in direction to the movement of the first named spring arm. Accordingly, the movement of the track frames takes place without subjecting the power plant or main frame to twisting stresses and, by reason of the construction illustrated and explained, the track frames are free to follow inequalities of the ground, the front ends swinging up or down about their pivoted rear ends.

Additionally, it will be noted, these spring arms, i. e. the springs themselves, serve as struts which guide the front ends of the tracks, keeping the front ends at all times the right distance apart, with the tracks maintained in parallelism and in alignment with the power plant.

As already stated, I do not desire to be confined to a power plant or main frame construction such as illustrated and I do not desire to be confined to the precise details of the suspension or mounting for the front part of the power plant shown but aim in my claims to cover all modifications which do not involve a departure from the spirit and scope of the invention.

Having thus described my invention, I claim:

1. In a tractor having a main frame and track frames on opposite sides thereof, a suspension therefor including pivoted arms extending between the main frame and the forward portions of the track frames, each arm comprising a plurality of superimposed leaf springs and a two part clamp, and means extending between the two parts of the clamp for securing them and the leaves in fixed relation to one another, one part of the clamp having a pivotal connection with the main frame and the other part of the clamp having a link connection with the corresponding part of the clamp of the other arm.

2. In combination with a tractor having a main frame and track frames on opposite sides thereof, of a suspension for the main frame including a pair of laterally extending resilient arms having their outer ends connected to said track frames, clamping members for the inner ends of said arms having pivotal connection with said main frame, and a connecting element between said members whereby the latter are moved in unison.

3. In combination with a tractor having a main frame and track frames on opposite sides thereof, of a suspension for the main frame including a pair of cantilever springs having their outer ends connected to said track frames, clamping members rigidly connected to the inner ends of said springs and pivotally connected to said main frame, and a link connected to said clamping members to move the latter in unison.

4. In combination with a tractor having a main frame and track frames on opposite sides thereof, of a suspension for the main frame including a pair of laterally extending resilient members having their outer ends connected to said track frames, upper clamping members for the inner ends of said resilient members pivotally connected to said main frame, lower clamping members for the inner ends of said resilient members, and a connecting link pivotally connected to said lower clamping members whereby force applied at the outer end of one resilient member is transmitted in an opposite direction to the other resilient member.

In testimony whereof, I hereunto affix my signature.

WILLIAM H. WHITACRE.